E. B. CROCKER.
DEVICE FOR DAMPING PRESSURE FLUCTUATIONS.
APPLICATION FILED FEB. 27, 1915.
1,162,982.
Patented Dec. 7, 1915.
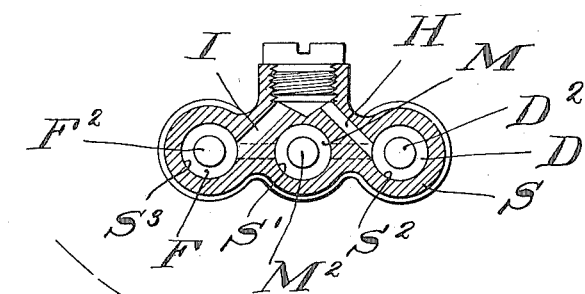
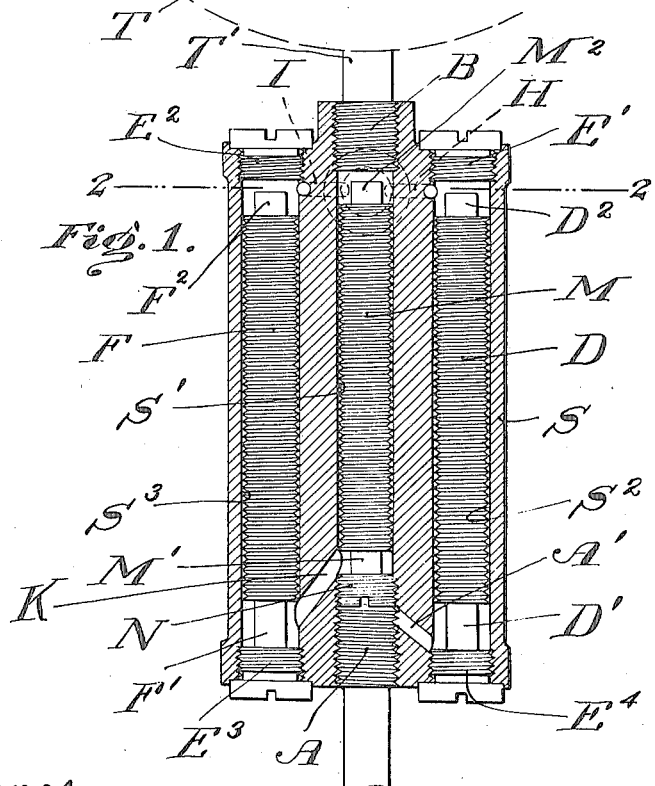

UNITED STATES PATENT OFFICE.

ERNEST B. CROCKER, OF BRIDGEPORT, CONNECTICUT, ASSIGNOR TO THE ASHCROFT MANUFACTURING COMPANY, OF BRIDGEPORT, CONNECTICUT, A CORPORATION OF CONNECTICUT.

DEVICE FOR DAMPING PRESSURE FLUCTUATIONS.

1,162,982.  Specification of Letters Patent.  Patented Dec. 7, 1915.

Application filed February 27, 1915. Serial No. 11,050.

*To all whom it may concern:*

Be it known that I, ERNEST B. CROCKER, a citizen of the United States, and resident of Bridgeport, in the county of Fairfield and State of Connecticut, have invented new and useful Improvements in Devices for Damping Pressure Fluctuations, of which the following is a specification.

My invention consists of a contrivance for checking or damping pressure fluctuations, and is adapted to use with pressure gages or other instruments which are liable to derangement if subjected to rapid or violent changes in pressure.

In many varieties of mechanical apparatus for example, compressors, pumps, turbines, the internal pressure fluctuates violently, or rapidly, or both violently and rapidly. Sensitive instruments for example, pressure gages, when attached to such apparatus, are liable to injury if subjected to the pressure fluctuations which inevitably occur, and thus become inaccurate and are frequently worn out in a short time after installation. Choke coils have been applied to meet this situation, such as, for instance, that described in Loomis' British Patents Nos. 13,850 of 1908, and 10,672 of 1909; choke coils, when interposed in the pressure communicating duct leading from a source of pressure to a gage or other pressure measuring or recording instrument, perform a function analogous to that of an inductance in electrical apparatus, by damping or smoothing out violent or rapid fluctuations in pressure, while communicating an average of pressure steadily to the measuring or recording instrument.

My invention provides a choking or damping coil for such purposes, and has for its objects facility in construction, accuracy, and susceptibility to adjustment and adaptation to a wide range of conditions, quick interchangeability of parts, facility in cleaning, and siphon protection of the gage or other sensitive instrument.

In the drawings hereto annexed which illustrate my invention in the form or forms preferred by me as the best in my estimation,—Figure 1 shows in vertical section a triple element choke coil and siphon; and Fig. 2 is a cross section taken at line 2—2 of Fig. 1.

I employ choke coils of the character illustrated in United States Patent to Swenson, No. 635,523, dated October 24, 1899, in which a tortuous dust of small cross section is formed by inserting a close-fitting screw-threaded filler in a cylindrical hole.

In order to provide a tortuous oscillation damping or choking duct of ample length while securing desirable compactness of apparatus, I have contrived the device shown in the drawings.

The casing S, which is preferably a cast block of bronze or other suitable material has several, in this case three, parallel cylindrical holes bored through it, at $S'$, $S^2$ and $S^3$. These holes are internally threaded for a short distance at each end, for purposes of inserting plugs or pipe connections, as may be desired. Each of the holes, $S'$, $S^2$, $S^3$, is provided with an externally screw threaded filler, which fits snugly in the hole. These fillers are shown at D, M and F. The thread forming the tortuous channel, cut in the fillers should have a flat top, so as to fit well against the side of the hole and thus prevent, or substantially reduce, leakage between one turn of the channel and another. The fillers D, M, F, are turned down at their ends, as shown at $D'$, $D^2$; $M'$, $M^2$; $F'$, $F^2$, so as to leave chambers in the ends of the holes $S'$, $S^2$ and $S^3$.

In order to produce an effect as if the tortuous channels, formed by the junction of the holes and fillers, were placed end to end, the holes $S^2$ and $S^3$ are fitted with tight screw plugs, $E'$, $E^4$; $E^2$, $E^3$, the connection with the source of pressure is made at A, and the hole $S'$ plugged by a screw-plug or stopper N. Passages $A'$, H, I and K are drilled in the body S, so that the entire conduit formed by the device consists of passage $A'$, (leading from the space between the stopper N, and the pipe connection at A) the tortuous or coiled passage formed by the threaded filler D in the hole $S^2$, the passage provided by holes H and I, the tortuous or coiled passage formed by the threaded filler F in the hole $S^3$, passage K, which leads from hole $S^3$ to hole $S'$, inside the screw-plug N, and finally the tortuous or coiled passage formed by the threaded filler M in the hole $S'$. The connection $T'$ to the pressure gage or other sensitive instrument, indicated by the dotted line at T, is made at the end of hole $S'$.

Thus the helical choke coil passages formed by the threads on the fillers M, D and F are joined in series, and a great length of passage is provided in a compact space. Moreover, the connections above described are such that the long passage is turned on itself to form a trap or "siphon", in which liquid either introduced when the damping device is assembled for use, or allowed to accumulate during use (as by steam condensation) serves to prevent access of steam to the gage or other sensitive instrument.

The above described device provides a very long coiled channel for damping pressure oscillations, while presenting a compact and convenient structure. It is susceptible of adjustment and variation with a minimum of difficulty, since one of several threaded fillers may be removed if a shorter effective length of choke coil is desired, or found adequate, or one or more threaded fillers can be turned down to any desired extent for the purpose of varying the effective length of coil.

In practically all cases a three-bore damping device will serve every purpose. If desired, however, damping devices essentially similar may be constructed with a larger number of interconnecting bores with internally fitted screw-threaded or otherwise tortuously channeled fillers.

In the drawings and the foregoing description the casing S is representative of any structural element which contains or is susceptible of being supplied with holes or passages adapted to receive fillers which, in relationship with the holes or passages which they occupy, provide the tortuous or threaded channels above described.

I claim:

1. A device for damping pressure fluctuations, comprising in combination a casing having a plurality of chambers therein, a filler fitting each chamber, one of the two said members in each case being tortuously channeled, the casing having passages in its body connecting the said chambers in series, and means for attaching tubular members at either extremity of the chamber series.

2. A device for damping pressure fluctuations, comprising in combination a casing having a plurality of chambers therein, a filler fitting each chamber but reduced in size at the end, one of the two said members in each case being tortuously channeled, the casing having passages in its body connecting the said chambers in series, and means for attaching tubular members at either extremity of the chamber series.

3. A device for damping pressure fluctuations, comprising in combination a casing having a plurality of parallel chambers therein, a filler fitting each chamber, one of the two said members in each case being tortuously channeled, the casing having passages in its body connecting the said chambers in series, and means for attaching tubular members at either extremity of the chamber series.

4. A device for damping pressure fluctuations, comprising in combination a casing having three parallel chambers passing entirely through it, one of said chambers provided at its ends with means for attaching tubular members and with a stopper near one end, removable caps on the ends of the second and third chambers, a removable filler in each chamber, fitting the same, one of each two said mutually fitting members being tortuously channeled, the casing provided with a passage leading from the first chamber at a point outside the stopper to one end of the second chamber, another passage leading from the other end of the second chamber to one end of the third chamber, and a third passage leading from the other end of the third chamber to the first chamber at a point inside the stopper.

Signed by me at Bridgeport, Connecticut, this 25th day of February, 1915.

ERNEST B. CROCKER.

Witnesses:
F. C. BLANCHARD,
G. A. O'CONNELL.